United States Patent
Kim

(10) Patent No.: US 12,547,319 B2
(45) Date of Patent: Feb. 10, 2026

(54) SYSTEM AND METHOD FOR VERIFYING MEMORY INTEGRITY

(71) Applicant: HYUNDAI MOBIS CO., LTD., Seoul (KR)

(72) Inventor: Soo Mi Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 259 days.

(21) Appl. No.: 18/335,844

(22) Filed: Jun. 15, 2023

(65) Prior Publication Data

US 2024/0126454 A1   Apr. 18, 2024

(30) Foreign Application Priority Data

Oct. 12, 2022   (KR) .................. 10-2022-0130170

(51) Int. Cl.
*G06F 3/06* (2006.01)
*H04L 9/32* (2006.01)

(52) U.S. Cl.
CPC .......... *G06F 3/0619* (2013.01); *G06F 3/0653* (2013.01); *G06F 3/0679* (2013.01); *H04L 9/3242* (2013.01)

(58) Field of Classification Search
CPC .... G06F 3/0619; G06F 3/0653; G06F 3/0679; G06F 21/554; G06F 21/575; G06F 21/64; H04L 9/0816; H04L 9/3242
See application file for complete search history.

(56) References Cited

U.S. PATENT DOCUMENTS

| | | | |
|---|---|---|---|
| 2006/0269066 A1* | 11/2006 | Whitehead | H04L 63/0428 380/270 |
| 2017/0213054 A1* | 7/2017 | Chen | H04L 9/083 |
| 2019/0102539 A1* | 4/2019 | Durham | G06F 21/57 |
| 2023/0094673 A1* | 3/2023 | Patel | G06F 21/602 713/193 |

OTHER PUBLICATIONS

Harba, Eman Salim Ibrahim. "Secure data encryption through a combination of AES, RSA and HMAC." Engineering, Technology & Applied Science Research 7.4 (2017): 1781-1785. (Year: 2017).*
Li, He, et al. "Cumulative message authentication codes for resource-constrained networks." 2020 IEEE Conference on Communications and Network Security (CNS). IEEE, 2020. (Year: 2020).*

* cited by examiner

*Primary Examiner* — Nicholas J Simonetti
(74) *Attorney, Agent, or Firm* — NSIP Law

(57) ABSTRACT

Methods and apparatuses for ensuring integrity of stored data in a flash memory, where a system for verifying memory integrity includes a secure memory module configured to store two or more key values for generating a message authentication code (MAC) value, an integrity verifier configured to generate a MAC value through two or more pre-stored MAC processes using a data table based on an analysis of data stored in a corresponding memory area and any one key value selected from the secure memory module according to a criterion and to compare the generated MAC value and a stored MAC value that is matched with a corresponding key value, and a verification processor configured to determine that data manipulation has occurred, in response to the generated MAC value and the stored MAC value not matching using a result of the comparison, and to perform a preset operation.

20 Claims, 4 Drawing Sheets

SYSTEM AND METHOD FOR VERIFYING MEMORY INTEGRITY

CROSS-REFERENCE TO RELATED APPLICATIONS

This application claims the benefit under 35 U.S.C. § 119 to Korean Patent Application No. 10-2022-0130170, filed on Oct. 12, 2022, in the Korean Intellectual Property Office, the entire disclosure of which is incorporated herein by reference for all purposes.

BACKGROUND

1. Field

The following description relates to a system and method for verifying memory integrity, and more particularly, to a system and method for verifying memory integrity capable of verifying integrity of a flash memory area by applying at least two types of MAC algorithms in parallel.

2. Description of Related Art

There is a message authentication code (MAC) value as a message authentication method for verifying data integrity.

In the security field of controllers (MCU, ECU, etc.) using the MAC value, the related art is configured in such a way as to selectively generate and store the MAC value only for necessary data (main data), generate the MAC value whenever corresponding data is used, and compare the generated MAC value with the stored MAC value.

When generating the MAC value, a shared secret key (symmetric key method) is usually used to generate data to be authenticated and the MAC value from the data to be authenticated. In other to manage the shared secret key, a module with secured security such as a hardware security module (HSM) is used, and the shared secret key is stored in the memory of the HSM.

In this way, each MAC value is generated for each selected necessary data and each MAC value is verified whenever the corresponding data is read. In this case, two problems to be described later occur.

First, it is impossible to secure integrity of data that is not selected as a target for generating the MAC values, and second, when a hash function attack occurs on selected main data (for example, birthday attack, etc.), vulnerabilities are not compensated for.

In this regard, Korean Patent Publication No. 10-1806719 ("The Electronic Control Unit Possible Auto Setting of Memory Area According to Secure Boot And Method for Secure Boot Using The Same") discloses a technology for verifying integrity without errors even after reprogramming by automatically setting a memory area even if software is reprogrammed, during secure booting to secure and verify the integrity of vehicle software.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a system for verifying memory integrity, including a secure memory module configured to store two or more key values for generating a message authentication code (MAC) value, an integrity verifier configured to generate a MAC value through two or more pre-stored MAC processes using a data table based on an analysis of data stored in a corresponding memory area and any one key value selected from the secure memory module according to a criterion and to compare the generated MAC value and a stored MAC value that is matched with a corresponding key value, and a verification processor configured to determine that data manipulation has occurred, in response to the generated MAC value and the stored MAC value not matching using a result of the comparison, and to perform a preset operation.

The integrity verifier may include an entire integrity verifier configured to use a result of the analysis of the data stored in the data table to generate MAC values for all data through any one of the pre-stored MAC processes using the all data and preset key values for the all data and to compare the generated MAC values and the stored MAC value that is matched with the corresponding key value.

The integrity verifier further may include a group integrity verifier configured to use the analysis result of the data stored in the data table to generate a MAC value for a corresponding main data group through another pre-stored MAC process using a preset key value for each of at least one predefined main data group, and to compare the generated MAC value and the stored MAC value that is matched with the corresponding key value.

The group integrity verifier may be configured to compare generated MAC values and stored MAC values for sequentially defined main data groups using the analysis result of the data stored in the data table.

The entire integrity verifier or the group integrity verifier may be configured to determine that data manipulation has occurred for all corresponding data or main data group, in response to the generated MAC value and the stored MAC value not matching, and to generate a manipulation occurrence alarm signal, and to replace and store the all corresponding data or the main data group with a pre-stored default value.

The integrity verifier may be configured to use the analysis result of the data stored in the data table in advance to generate and store MAC values for all data through one of the pre-stored MAC processes using any one of preset key values.

The integrity verifier may be configured to use the analysis result of the data stored in the data table in advance to generate and to store the MAC value for the corresponding main data group through another pre-stored MAC process using any one of preset key values for each group for at least one predefined main data group among all the data.

The integrity verifier may be configured to use the analysis result of data stored in the data table in advance to generate and to store MAC values for all main data groups sequentially defined.

In another general aspect, there is provided a processor-implemented method for verifying memory integrity using an arithmetic processor, the method including generating a message authentication code (MAC) value using two or more pre-stored MAC processes by reading, by an integrity verifier, a data table based on an analysis of data stored in a corresponding memory area and using any one key value selected according to a criterion from among two or more key values to generate a MAC value stored in a secure memory module, comparing, by the integrity verifier, the generated MAC value and a stored MAC value that is matched with a corresponding key value, and determining that data manipulation has occurred, in response to the generated MAC value and the stored MAC value not matching based on a result of the comparison, and performing a preset operation according to a result of the determination.

The MAC value may include reading the data table and using MAC values for all data and preset key values for the all data to generate the MAC values for the all data using any one of the pre-stored MAC processes.

The MAC value may include a group MAC generation step of reading the data table and using another pre-stored MAC process using preset key values for each of at least one predefined main data group among the all data to generate MAC values for each main data group using another pre-stored MAC process.

The group MAC generation step may be repeatedly performed to generate MAC values for predefined main data groups.

The method may include prior to the comparing, reading, by the integrity verifier, the data table based on an analysis of the data stored in the corresponding memory area and using key values for all the data among two or more key values for generating the MAC value stored in the secure memory module to generate and store the MAC values for the all data using any one of the pre-stored MAC processes.

The method may include prior to the comparing, a group MAC storage step of reading, by the integrity verifier, the data table and using key values for each of the predefined main data groups among two or more key values for generating the MAC value stored in the secure memory module to generate and store MAC values for each main data group using other pre-stored MAC processes.

The group MAC storage step may be repeatedly performed to generate and store the MAC values for the predefined main data groups.

The comparing may include reading the MAC value generated in the entire MAC generation step and the MAC value stored in the entire MAC storage step for the comparison.

The comparing may include a group data verification step of reading the MAC values generated for each main data group in the group MAC generation step and the MAC values for the each main data group stored in the group MAC storage step for the comparison of the each main data group.

The group data verification step may be repeatedly performed to for the comparison of the entire main data group.

The determining that the data manipulation has occurred may include generating a manipulation occurrence alarm signal of the corresponding data, and the corresponding data is replaced with a pre-stored default value and stored, in response to determining that the data manipulation has occurred.

Other features and aspects will be apparent from the following detailed description, the drawings, and the claims.

Figure 1:
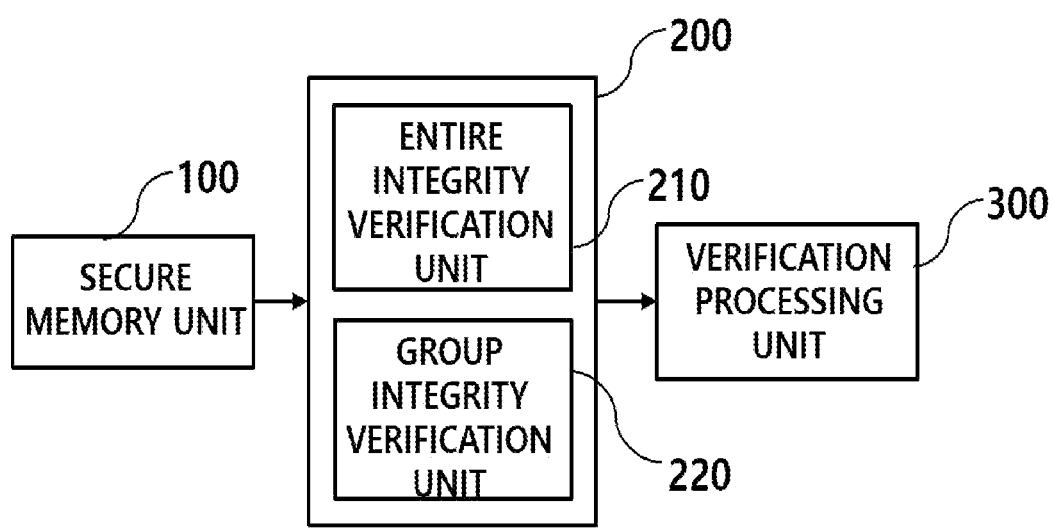
FIG. 1 is an exemplary configuration diagram illustrating a system for verifying memory integrity according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a preferred embodiment of a system and method for verifying memory integrity according to one or more embodiments will be described in detail with reference to the accompanying drawings.

A system means a set of components including devices, mechanisms, means, and the like, systematized in order to perform required functions and regularly interacting with one another.

A system and method for verifying memory integrity according to according to one or more embodiments is to secure integrity of data that is stored in an area in which data is stored among flash memory areas, for example, D-Flash, EEPROM, etc.

Normally, data, such as a calibration value, a changeable setting value, and a failure diagnosis log, is stored in a D-Flash area, and even if the pieces of information are updated by reprogramming, the existing information needs to be maintained, so these pieces of information are separately managed in ROM, not RAM, so that they are not erased by reprogramming or power off.

Briefly, the system and method for verifying memory integrity according to according to one or more embodiments utilizes a message authentication code (MAC) value using a symmetric key method to secure the integrity of data stored in a flash memory area, thereby generating and storing a MAC value in a memory and checking and verifying integrity before data is used.

That is, since storing (writing) the MAC value in the flash memory has limitations on the lifespan and operating time of the memory, in order to reflect the changed data only when a controller (MCU, ECU, etc.) is shut down, not always updated whenever the data is changed, the MAC value is calculated for the entire memory area or a main memory group, and then updated in the memory (preferably, HSM).

It is preferable to use a security MAC algorithm of the symmetric key method such as AES CMAC or HMAC to calculate the MAC value.

In addition, during secure boot-up after the shutdown, after a MAC value is newly generated for the memory (entire memory area or main memory group) at that time, it is checked whether the MAC value is the same as the pre-stored MAC value, and when the MAC value is not the same as the pre-stored MAC value, it is determined that the data stored in the memory has been manipulated or changed.

In this case, a data manipulation error alarm is transmitted to another controller such as a cluster, and data is replaced with a default value stored in another flash memory area (for example, C-FLASH area) to control an operation.

Of course, it is preferable to secure hardware security by using a memory of a security module embedded in a controller such as a hardware security module (HSM) to store a key value used to calculate the MAC value and the MAC value.

In addition, it is preferable to secure the independence of calculation performance by using a logic provided by the HSM for the MAC algorithm to be utilized as well.

In this case, the system and method for verifying memory integrity according to one or more embodiments as described above utilizes at least two types of MAC algorithms in parallel to secure integrity through data verification for the entire data (all data) stored in a flash memory area with any selected MAC algorithm, and secure integrity through individual data verification for selected (sorted) main data from all memories stored in the flash memory area with another MAC algorithm. Accordingly, it is possible to secure the integrity of individual data even if the integrity of all the data is broken.

Through this, it is possible to secure the integrity of the entire data (all data) which is the above-described problem, and since additional verification is performed through at least two types of MAC algorithms for selected main data, it is possible to improve security against hash function attacks.

In particular, regarding a birthday attack in which different data may have the same MAC value during a hash function attack, even if an attacker manipulates specific data or creates and stores the same MAC value created by the attack, since different MAC algorithms and different pre-shared keys are used for the MAC verification for all the data and the MAC verification for detailed data (main data), it is possible to detect attacks and manipulation occurrence.

In addition, by generating and verifying individual MAC values for each group instead of a single MAC value for main data, even if the main data in one group is damaged (integrity is broken) by attacks, the integrity of main data in another group can be secured, and as a result, it is possible to secure operational stability.

Considering this point, the system for verifying memory integrity according to one or more embodiments is operated by the secure memory module 100 (which may also be referred to as secure memory unit 100, the integrity verifier 200 (which may also be referred to as integrity verification unit 200), and the verification processor 300 (which may also be referred to as verification processing unit 300), as illustrated in FIG. 1. Each component performs an operation through a controller such as a micro controller unit (MCU), an arithmetic processing unit, and the like.

In addition, as a target for ensuring data integrity by the system for verifying memory integrity according to one or more embodiments, which will be described later, like the D-flash memory area and EEPROM, a ROM area in which data to be changed, not codes, is stored will be limitedly described. However, this is only an example and is applicable to all memory areas in which data is stored.

The secure memory unit 100 stores two or more keys for generating a MAC value, that is, a pre-shared secret key value. In this case, as described above, the secure memory unit 100 is preferably the HSM, which is the security module built into the controller.

The HSM is the security module independently configured in HW apart from a general core in the microcomputer, and the pre-shared MAC algorithm and the secret key value are stored.

In this case, in the system for verifying memory integrity according to one or more embodiments, as described above, in order to generate the MAC value for performing the integrity verification for all the data and the integrity verification for the main data group, at least two type of MAC algorithms (for example, HMAC, AES-CMAC, etc.) and a secret key for generating each MAC value are shared in advance.

In this case, the secret key shares one secret key (primary key) for the integrity verification for all the data and at least one secret key (secondary key) as many as the number of main data groups defined in the data table for the integrity verification for the main data group, and since the secret key is stored in the HSM, the security of the shared secret key is secured.

The integrity verification unit 200 uses the data table which is the analysis result of data stored in the corresponding memory area, and any one key value selected according to a predetermined criterion set in advance from the secure memory unit 100, thereby generating the MAC value through the pre-stored MAC algorithm. In addition, the generated MAC value and the MAC value that is matched to the corresponding key value and stored are compared and analyzed. In this case, the stored MAC value is not included in the data table, which is a list of data integrity verification targets, but is separately stored and managed in the data memory area.

In detail, the integrity verification unit 200 is operated by control logic that performs the integrity verification stored in the general area of the MCU.

In this case, the MCU uses a bootloader to which the secure boot is applied to secure the integrity of the area (C-FLASH area) where the code to be operated is stored.

In addition, the data table is stored in advance in the integrity verification unit 200, and as described above, the data table includes the results after primarily analyzing the data stored in the corresponding memory area (D-FLASH area). The data table includes an index, a main data target, corresponding group information for the main data target, an RTE interface function pointer for reading data, a data size, initialization value (default value) address information stored in the C-FLASH, etc.

Here, the index is numerical information that increases sequentially from 0, and the main data target and the corresponding group information are numerical information starting from 0. General data, not the main data, is set to 0, and in the case of the main data, a group number that increases from 1 is set according to the classification of the group.

Based on the stored data table, the integrity verification unit 200 primarily performs the MAC verification for all the data, and secondarily performs individual MAC verification for each main data group. As a result, even if the integrity of the entire data area is broken due to manipulation of data in a specific area, it is possible to secure individual integrity by classifying main data groups that have no manipulation influence according to individual MAC verification results for each main data group, so there is an advantage of increasing the stability of software operation.

The ROM area, such as the D-FLASH or the EEPROM, has a life cycle of memory, so the lifespan needs to be considered because there is the number of times that may be written. Therefore, there is a need for a different control method from RAM that is always used after updating (re-writing) whenever data needs to be changed. Accordingly, in general, the ROM area copes with a life cycle of memory in consideration of cars used for several years to decades by applying a method of storing and ending writing of data during shutdown after storing the finally changed contents.

Considering this point, the integrity verification unit 200 also generates and stores a MAC value when storing data to the corresponding memory during the shutdown according to a general method based on a large process, and then generates a new MAC value during start-up and compares the new MAC value with the stored MAC value to performs a verification procedure, thereby confirming the data integrity.

In the integrity verification unit 200, the operation of generating and storing the MAC value when storing the finally changed data in the memory during the shutdown will be described in detail later. First, the data integrity verification procedure during the start-up will be described.

That is, in summary, the integrity verification unit 200 generates a new MAC value based on the data table stored in advance to check whether data is changed by manipulating the stored memory during the start-up, and compares and analyzes the newly generated MAC with the MAC value stored during the previous shutdown (previous MAC value), thereby securing the data integrity.

To this end, as illustrated in FIG. 1, the integrity verification unit 200 includes an entire integrity verifier 210 (which may also be referred to as entire integrity verification unit 210) and a group integrity verifier 220 (which may also be referred to as group integrity verification unit 220).

The integrity verification unit 200 generates the procedure of generating and verifying the MAC at least twice according to the data table stored in the general area (general memory area) (primary MAC generation/verification for all data, secondary MAC generation/verification for each main data group) during the start-up.

The entire integrity verification unit 210 uses a pre-stored first MAC algorithm (for example, HMAC algorithm) to generate MAC values for all data according to the stored data table. In this case, among the key values stored in the secure memory unit 100, a preset key value (primary key) is used for all data.

Thereafter, the MAC values for the entire memory pre-stored by matching the generated MAC value with the corresponding key value (primary key) are compared and analyzed. In this case, the MAC values for the entire memory pre-stored is generated and stored using the pre-stored first MAC algorithm and the preset key value (primary key) for all the data finally changed during the previous shutdown.

That is, the entire integrity verification unit 210 generates the MAC values for all the data (entire data) based on the data table during the start-up, and compares the generated MAC values with the MAC values stored during the previous shutdown, thereby performing the integrity verification on all the data.

When the generated MAC value and the stored MAC value do not match using the comparative analysis result of the entire integrity verification unit 210, the verification processing unit 300 determines that the manipulation of the entire data has occurred, thereby performing the preset operation.

In detail, the manipulation occurrence alarm signal is generated to inform an external linking means that the manipulation occurs on the corresponding data (entire data), and since the value stored in the corresponding memory area is the manipulated value, the value is erased and then is replaced with an initial (default) value (default value, etc.), which is stored in the C-FLASH area, and stored.

In this case, the initial value used for replacement assumes that the integrity of the C-FLASH area has been secured through the secure boot process, which is a prerequisite, and the operation is performed.

Of course, it is most preferable to replace and store all data, but since all the data is replaced with the initial value and stored, it is preferable to replace data as little as possible based on the comparative analysis result of the group integrity verification unit 220.

The group integrity verification unit 220 performs the integrity verification on the main data group according to the stored data table, regardless of the comparative analysis result of the entire integrity verification unit 210.

In detail, the group integrity verification unit 220 uses a pre-stored second MAC algorithm (any MAC algorithm different from the first MAC algorithm, for example, AES-CMAC algorithm) to generate MAC values for each main data group for each of at least one predefined main data group according to the stored data table. In this case, among the key values stored in the secure memory unit 100, a preset key value (secondary key) is used for each main data group.

Thereafter, the MAC values for each main data group pre-stored by matching the generated MAC value with the corresponding key value (secondary key) are compared and analyzed. In this case, the MAC values for each main data group pre-stored is generated and stored using the pre-stored second MAC algorithm and the preset key value (secondary key) for each main data group defined for all the data finally changed during the previous shutdown. Of course, the MAC values for each main data group are generated and stored for all main data groups using key values (secondary keys for each group) stored as many as the number of defined main data groups.

Through this, the group integrity verification unit 220 generates the MAC values for each main data group based on the data table at the startup, and compares the generated MAC value with the MAC values for each main data group stored during the previous shutdown, thereby performing the integrity verification on each main data group.

In this case, the group integrity verification unit 220 compares and analyzes the MAC values generated sequentially for each main data group and the MAC values for each main data group stored during the previous shutdown based on the stored data table, thereby performing the integrity verification on all the defined main data groups.

When the generated MAC value and the stored MAC value do not match using the comparative analysis result of the group integrity verification unit 220, the verification processing unit 300 determines that the manipulation of the corresponding main data group has occurred, thereby performing the preset operation. Of course, the verification processing unit 300 performs an operation according to the comparative analysis result by the group integrity verification unit 220 for each main data group. Through this, after performing the operation using the comparative analysis result of the entire main data group, the integrity verification ends.

In detail, the manipulation occurrence alarm signal is generated to inform an external linking means that the manipulation occurs on the corresponding data (main data group), and since the value stored in the corresponding memory area is the manipulated value, the value is erased and then is replaced with an initial (default) value (default value, etc.), which is stored in the C-FLASH area, and stored.

In this case, the initial value used for replacement assumes that the integrity of the C-FLASH area has been secured through the secure boot process, which is a prerequisite, and the operation is performed.

As the comparative analysis result of the entire integrity verification unit 210, since the generated MAC value and the stored MAC value do not match, even if the integrity of the entire data is broken, regardless of the comparative analysis result of the entire integrity verification unit 210, the operation through the group integrity verification unit 220 is performed.

If the integrity of the entire data is broken, as the comparative analysis result by the group integrity verification unit 220, when the MAC value generated by a specific main data group and the stored MAC value match (same), it is determined that the data of the corresponding main data group is protected from a birthday attack, which is one of the attacks through the MAC authentication method, and the data of the corresponding main data group maintains the data stored during the previous shutdown.

In addition, if the integrity of the entire data is broken, as the comparative analysis result by the group integrity verification unit 220, since a MAC value generated by another specific main data group and the stored MAC value do not match, when the integrity of the corresponding main data group is broken, it is finally determined that the data manipulation has occurred, and the data of the corresponding main data group is replaced with the initial value and stored.

In addition, as the comparative analysis result of the entire integrity verification unit 210, even if the generated MAC value and the stored MAC value match, and thus, the integrity verification for all data has been performed, the integrity verification may not be performed on data of any main data group as the comparative analysis result of the group integrity verification unit 220. In this case, the verification processing unit 300 determines that the birthday attack, which is one of the attacks through the MAC authentication method, has been made to the corresponding main data group, and replaces and stores the data of the corresponding main data group with the initial value.

For example, even if the integrity of the entire A data is broken, by performing the integrity verification for each group of A-1, A-2, and A-3 main data constituting the entire A data, when the MAC values generated by the A-1 and A-2 main data groups and the stored MAC value match (same), it is determined that the data of the A-1 and A-2 main data groups is protected from the birthday attack, and the data stored the previous shutdown is maintained as it is.

Of course, the data of the A-3 main data group constituting the birthday attack is replaced with the initial value and stored.

The performance results by the verification processing unit 300 are summarized as in Table 1 below.

TABLE 1

| | Entire integrity verification unit | Group integrity verification unit | Analysis result determination |
|---|---|---|---|
| Analysis result | Match | Match | Integrity verification |
| | Match | Mismatch | Some data manipulation (birthday attack) |
| | Mismatch | Match | Some data manipulation (birthday attack detection) |
| | Mismatch | Mismatch | Data manipulation |

Through this, as comparative analysis result of the entire integrity verification unit 210, since the integrity is broken, the replacement storage with the initial value needs to be performed for all data, but in this case, since there is another problem that may occur, it is preferable to specify the data to be replaced with the initial value through the group integrity verification unit 220 and stored.

Figure 2:
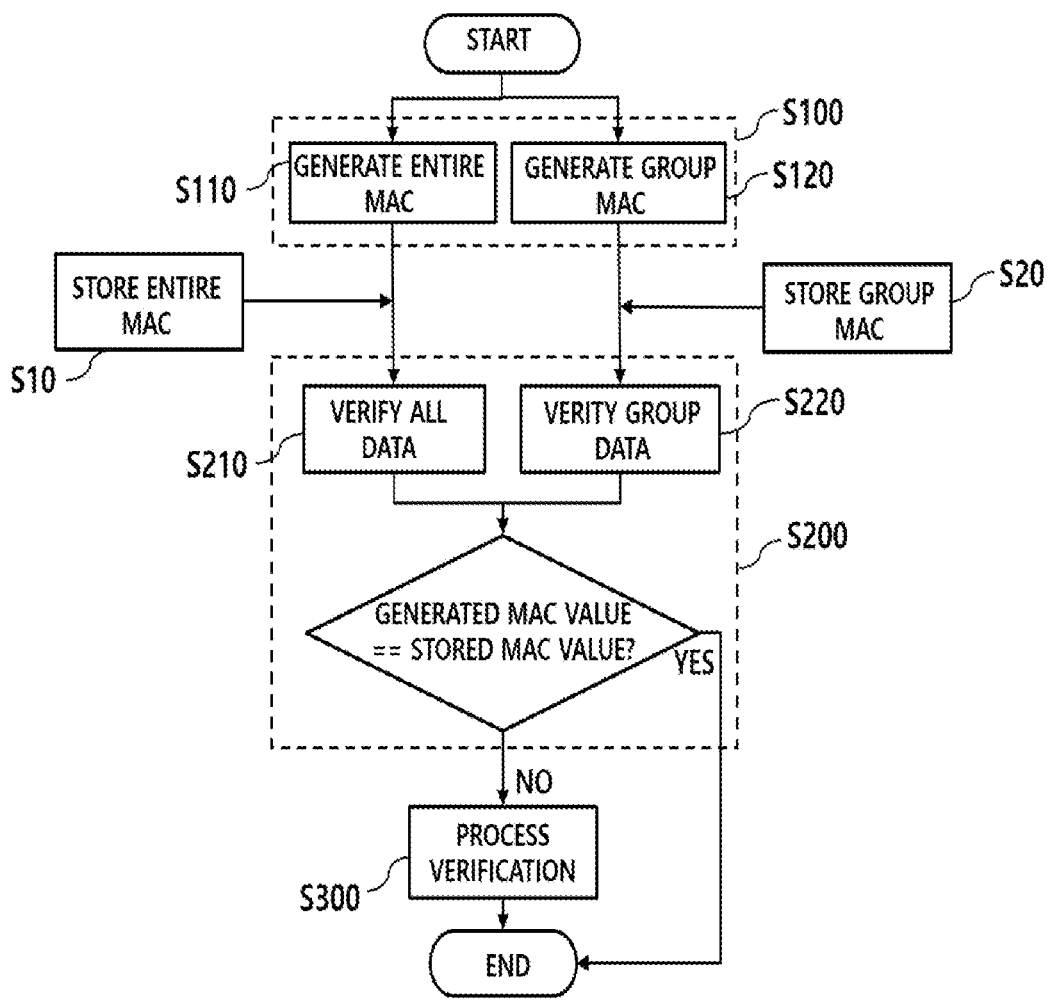
FIGS. 2 to 4 are flowcharts illustrating a method for verifying memory integrity according to one or more embodiments.
Figure 3:
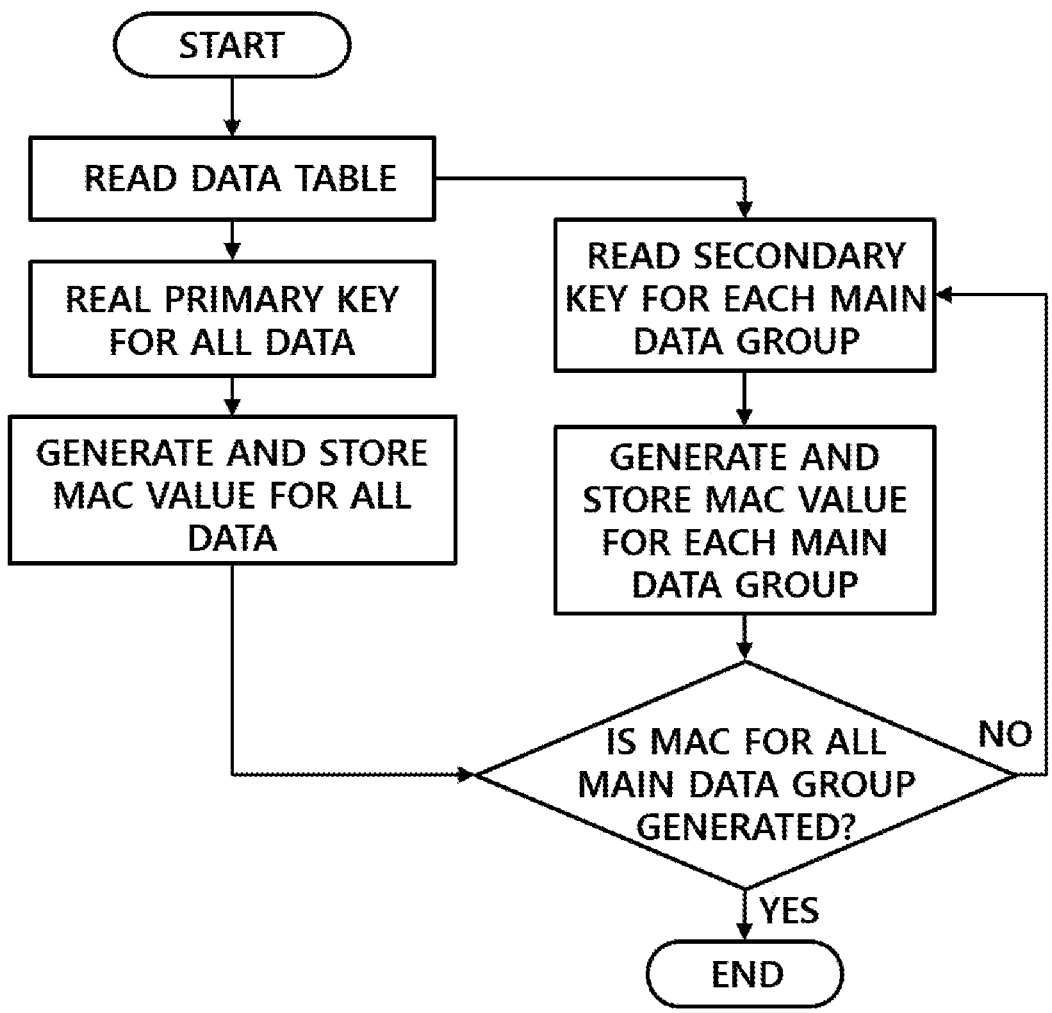
Figure 4:
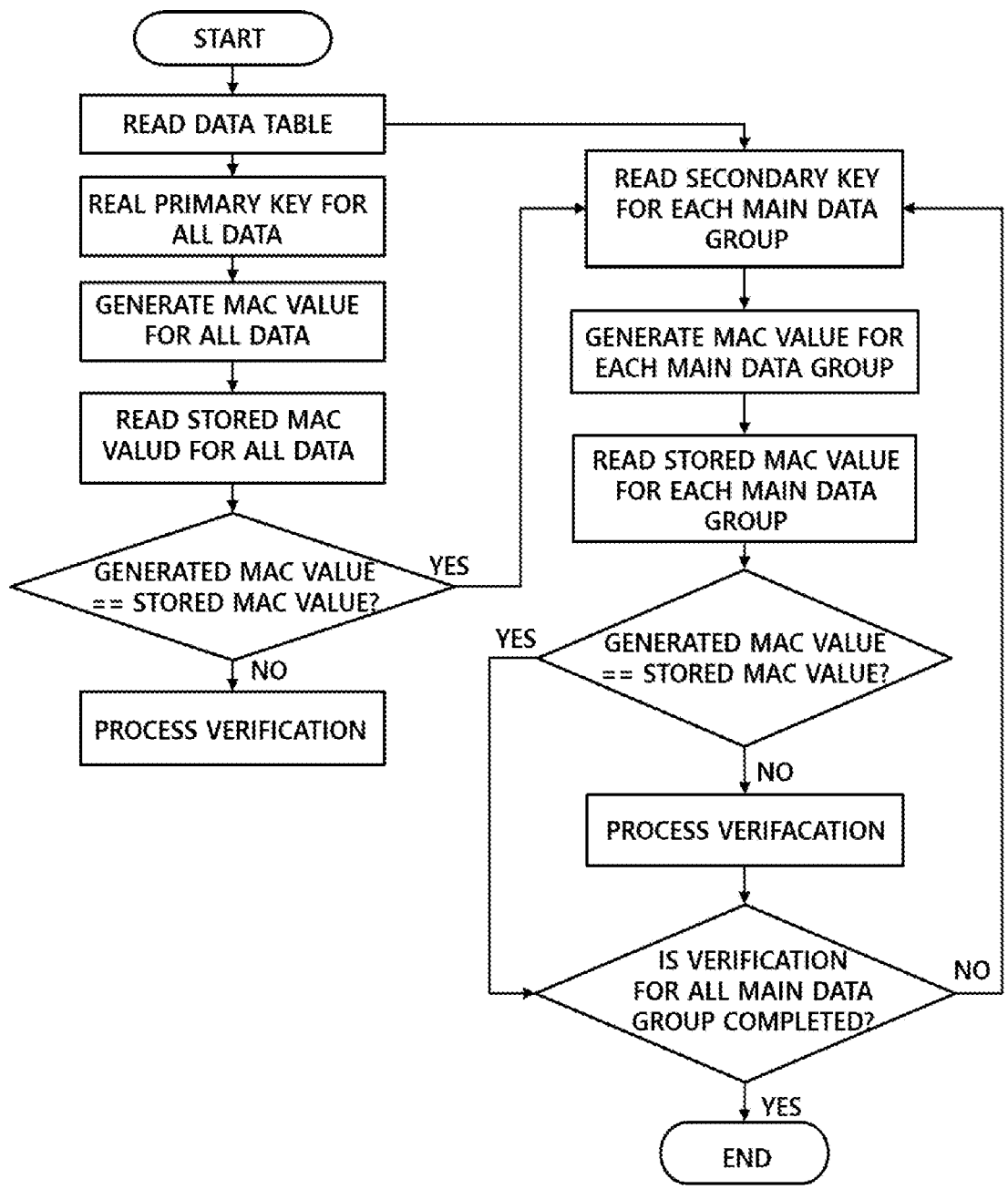

FIGS. 2 to 4 are flowcharts illustrating a method for verifying memory integrity according to one or more embodiments.

As illustrated in FIG. 2, the method for verifying memory integrity according to one or more embodiments includes a MAC generation step S100, a verification step S200, and a verification processing step S300. Each step preferably uses a system for verifying memory integrity in which an operation is performed through a controller such as a micro controller unit (MCU), an arithmetic processing unit, or the like.

Each step will be described in detail.

In the MAC generation step (S100), the integrity verification unit 200 reads the data table, which is an analysis result of data stored in the corresponding memory area (it is limited to the ROM area where the data to be changed rather than the code is stored, such as a D-flash memory area which is the data integrity target and EEPROM, but is only an example, and is applicable to all memory areas where data is stored), and uses any one key value selected according to a predetermined criterion among two or more key values for generating the MAC value stored in the secure memory unit 100 to generate using the pre-stored MAC algorithm.

Here, the data table includes the results after primarily analyzing the data stored in the corresponding memory area (D-FLASH area). The data table includes an index, a main data target, corresponding group information for the main data target, an RTE interface function pointer for reading data, a data size, initialization value (default value) address information stored in the C-FLASH, etc.

Here, the index is numerical information that increases sequentially from 0, and the main data target and the corresponding group information are numerical information starting from 0. General data, not the main data, is set to 0, and in the case of the main data, a group number that increases from 1 is set according to the classification of the group.

In detail, in the MAC generation step (S100), the MAC values for all the data or the main data group are generated based on the data table using the pre-stored MAC algorithm. In this case, the secret key value is shared in advance for each data (all data or main data group) and stored in the secure memory unit 100.

The secret key shares one secret key (primary key) for the integrity verification for all the data and at least one secret key (secondary key) as many as the number of main data groups defined in the data table for the integrity verification for the main data group, and since the secret key is stored in the HSM, the security of the shared secret key is secured.

The ROM area, such as the D-FLASH or the EEPROM, has a life cycle of memory, so the lifespan needs to be considered because there is the number of times that may be written. Therefore, there is a need for a different control method from RAM that is always used after updating (re-writing) whenever data needs to be changed. Accordingly, in general, the ROM area copes with a life cycle of memory in consideration of cars used for several years to decades by applying a method of storing and ending writing of data during shutdown after storing the finally changed contents.

Considering this point, the integrity verification unit 200 also generates and stores a MAC value when storing data to the corresponding memory during the shutdown according to a general method based on a large process, and then generates a new MAC value during start-up and compares the new MAC value with the stored MAC value to performs a verification procedure, thereby confirming the data integrity.

Accordingly, in the MAC generation step (S100), the operation is performed during the start-up, and during the start-up, in order to check whether data is changed by manipulating the stored memory, the MAC value is newly generated based on the pre-stored data table. As illustrated in FIG. 2, the MAC generation step (S100) includes an entire MAC generation step (S110) and a group MAC generation step (S120).

In the entire MAC generation step (S110), the pre-stored first MAC algorithm (for example, HMAC algorithm) is used to generate the MAC values for all the data according to the stored data table. In this case, among the key values stored in the secure memory unit 100, a preset key value (primary key) is used for all data.

In the group MAC generation step (S120), the pre-stored second MAC algorithm (any MAC algorithm different from the first MAC algorithm, for example, AES-CMAC algorithm) is used to generate the MAC values for each main data group for each of at least one predefined main data group according to the stored data table. In this case, among the key values stored in the secure memory unit 100, the preset key value (secondary key) is used for each main data group. In this case, the group MAC generation step (S120) is repeatedly performed to generate the MAC values for all the predefined main data groups. That is, in the group MAC generating step (S120), the MAC values are sequentially generated for each main data group for all the defined main data groups based on the stored data table.

As an example of the repetitive process, after generating the MAC values for any one main data group, it is determined whether there is the main data group in which the MAC value has not been generated, and when there is the main data group, the MAC value of the corresponding main data group is generated, and when there is no main data group, the corresponding step ends.

In the verification step (S200), the integrity verification unit 200 reads the MAC value generated in the MAC generation step (S100) and the MAC value matched with the key value corresponding to the MAC generation step (S100) and stored, and performs the comparative analysis.

In other words, in the verification step (S200), to check whether data is changed by manipulating the stored memory during the start-up, the data integrity is secured by comparing and analyzing the newly generated MAC value based on the pre-stored data table with the MAC value (previous MAC value) stored during the previous shutdown.

In this case, in the verification step (S200), based on the stored data table, the MAC verification is primarily performed for all the data, and secondarily individual MAC verification is performed for each main data group. As a result, even if the integrity of the entire data area is broken due to manipulation of data in a specific area, it is possible to secure individual integrity by classifying main data groups that have no manipulation influence according to individual MAC verification results for each main data group, so there is an advantage of increasing the stability of software operation.

In addition, as illustrated in FIGS. 2 and 3, when storing data in the memory corresponding to the finally changed contents during the shutdown, the integrity verification unit 200 generates and stores the MAC value. To this end, the entire MAC storage step (S10) and the group MAC storage step (S20) is further included.

That is, in the entire MAC saving step (S10) and the group storage step (S20), when the finally changed data is stored in the memory during the shutdown, the operation of generating and storing the MAC value is performed.

In the entire MAC storing (S10), the MAC values are generated and stored using the pre-stored first MAC algorithm and the preset key value (primary key) for all the data, which is all the data finally changed during the shutdown.

In addition, in the group MAC storage step (S20), the MAC values are generated and stored using the pre-stored second MAC algorithm and the preset key value (secondary key) for each main data group defined for all the data finally changed during the shutdown. Of course, the MAC values for each main data group are generated and stored for all main data groups using key values (secondary keys for each group) stored as many as the number of defined main data groups. That is, the group MAC storage step (S20) is repeatedly performed so that each MAC value for all the predefined main data groups is generated and stored.

As an example of the repetitive process, as illustrated in FIG. 3, after generating and storing the MAC values for any one main data group, it is determined whether there is the main data group in which the MAC value has not been generated, and when there is the main data group, the MAC value of the corresponding main data group is generated and stored, and when there is no main data group, the corresponding step ends.

Through this, in the verification step (S200), the integrity verification unit 200 reads the MAC value generated in the MAC generation step (S100) and the MAC value matched with the key value corresponding to the MAC generation step (S100) and stored, and performs the comparative analysis.

In other words, in the verification step (S200), the MAC value newly generated in the entire MAC generation step (S110) or the group MAC generation step (S120) is compared with the MAC value stored in the entire MAC storage step (S10) or the group MAC storage step (S20) to perform the verification procedure, thereby checking the data integrity.

To this end, as illustrated in FIGS. 2 and 4, the verification step (S200) includes an entire data verification step (S210) and a group data verification step (S220). Through this, the procedure of generating and verifying the MAC at least twice according to the data table stored in the general area (general memory area) (primary MAC generation/verification for all the data, secondary MAC generation/verification for each main data group) is generated during the start-up.

In the entire data verification step (S210), the MAC value generated in the entire MAC generation step (S110) and the MAC value stored in the entire MAC storage step (S10) are read and compared and analyzed.

In detail, in the entire MAC generation step (S110), the MAC values for all the data (entire data) are generated based on the data table during the start-up, and in the entire data verification step (S210), the MAC value generated in the entire MAC generation step (S110) and the MAC value (MAC value stored in the entire MAC storage step (S10)) stored during the shutdown are compared to perform the integrity verification on the entire data.

In the verification processing step (S300), as a result of performing the comparative analysis in the verification step (S200), when the generated MAC value and the stored MAC value do not match, it is determined that the data manipulation has occurred, and the preset operation is performed according to the determination result.

In detail, in the verification processing step (S300), when it is determined as the determination result that data manipulation has occurred, the manipulation occurrence alarm signal of the corresponding data is generated, and the corresponding data is replaced with a default value (basic value) pre-stored and stored.

As a result, in the verification processing step (S300), as a result of performing the comparative analysis in the verification step (S210), when the generated MAC value and the stored MAC value do not match, it is determined that the entire data manipulation has occurred, and thus, the preset operation is performed.

For example, the manipulation occurrence alarm signal is generated to inform an external linking means that the manipulation occurs on the corresponding data (entire data), and since the value stored in the corresponding memory area is the manipulated value, the value is erased and then is replaced with an initial (default) value (default value, etc.), which is stored in the C-FLASH area, and stored.

In this case, the initial value used for replacement assumes that the integrity of the C-FLASH area has been secured through the secure boot process, which is a prerequisite, and the operation is performed.

Of course, it is most preferable to perform replacement storage for all data, but since all the data is replaced with the initial value and stored, it is preferable to replace data as little as possible in consideration of the comparative analysis result in the group data verification step (S220).

For this purpose, in the group data verification step (S220), for each main data group based on the data table, the MAC value generated in the group MAC generation step (S120) and the MAC value stored in the group MAC storage step (S20) are read and compared and analyzed.

In detail, in the group data verification step (S220), during the start-up, the MAC values generated for each main data group based on the data table in the group MAC generation step (S120) and the MAC values (MAC values stored in the group MAC storing step (S20)) for each main data group stored during the previous shutdown are compared to perform the integrity verification on each main data group.

In this case, in the group data verification step (S220), the integrity verification is sequentially performed on the main data groups, as illustrated in FIG. 4, so that the comparative analysis result for all the main data groups may be performed. By determining whether there is the main data group for which the integrity verification has not been completed, when there is the main data group, the integrity verification is performed on the corresponding main data group, and when there is no main data group, the corresponding step ends.

As a result, in the verification processing step (S300), as the comparative analysis result in the group data verification step (S220), when the MAC value generated for each main data group and the stored MAC value do not match, it is determined that the manipulation of the corresponding main data group has occurred, and as a result, the preset operation is performed.

In the verification processing step (S300), the operation is performed using the comparative analysis result in the group data verification step (S220) for each main data group. Through this, after performing the operation using the comparative analysis result of the entire main data group, the integrity verification ends.

In detail, the manipulation occurrence alarm signal is generated to inform an external linking means that the manipulation occurs on the corresponding data (main data group), and since the value stored in the corresponding memory area is the manipulated value, the value is erased and then is replaced with an initial (default) value (default value, etc.), which is stored in the C-FLASH area, and stored.

In this case, the initial value used for replacement assumes that the integrity of the C-FLASH area has been secured through the secure boot process, which is a prerequisite, and the operation is performed.

Considering this point, in the verification processing step (S300), as the comparative analysis result of the entire data verification step (S210), since the generated MAC value and the stored MAC value do not match, even when the integrity of the entire data is broken, the group data verification step (S220) is performed regardless of the comparative analysis result of the entire data.

As a result, in the verification processing step (S300), when the integrity of the entire data is broken, as the comparative analysis result in the group data verification step (S220), when the MAC value generated by a specific main data group and the stored MAC value match (same), it is determined that the data of the corresponding main data group is protected from a birthday attack, which is one of the attacks through the MAC authentication method, and the data of the corresponding main data group maintains the data stored during the previous shutdown.

In addition, in the verification processing step (S300), when the integrity of the entire data is broken, as the comparative analysis result by the group data verification step (S220), since a MAC value generated by another specific main data group and the stored MAC value do not match, when the integrity of the corresponding main data group is broken, it is finally determined that the data manipulation has occurred, and the data of the corresponding main data group is replaced with the initial value and stored.

In addition, in the verification processing step (S300), despite the integrity verification for the entire data, as the comparative analysis result of the group data verification step (S220), when the integrity verification is broken for any main data group data, it is determined that the birthday attack, which is one of the attacks through the MAC authentication method, has been made to the corresponding main data group, and the data of the corresponding main data group is replaced with the initial value and stored.

That is, as described above, in the verification processing step (S300), when the integrity is broken by the comparative analysis result in the entire data verification step (S210), the replacement storage with the initial value should be performed for the entire data, but in this case, since there is another problem that may occur, there is an advantage in that the data to be replaced with the initial value may be specified through the group data verification step (S220), and even if some of the main data groups are subjected to the birthday attack and the integrity verification is performed on the entire data, there is an advantage in that it may be determined and processed through the group data verification.

According to a system and method for verifying memory integrity according to one or more embodiments as described above, by utilizing at least two types of MAC algorithms in parallel, integrity is secured through data verification for the entire data (all data) stored in a flash memory area with any selected MAC algorithm, and integrity is secured through individual data verification for selected (sorted) main data from all memories stored in the flash memory area with another MAC algorithm. Accordingly, it is possible to secure the integrity of individual data even if the integrity of all the data is broken.

Through this, it is possible to secure the integrity of the entire data (all data), and since additional verification is performed through at least two types of MAC algorithms for selected main data, it is possible to improve security against hash function attacks.

In particular, regarding a birthday attack in which different data may have the same MAC value during a hash function attack, even if an attacker manipulates specific data or creates and stores the same MAC value created by the attack, since different MAC algorithms and different pre-shared keys are used for the MAC verification for all the data and the MAC verification for detailed data (main data), it is possible to detect attacks and manipulation occurrence.

In addition, by generating and verifying individual MAC values for each group instead of a single MAC value for main data, even if the main data in one group is damaged (integrity is broken) by attacks, the integrity of main data in another group can be secured, and as a result, it is possible to secure operational stability.

DETAIL OF EXAMPLE ELEMENTS

10: Sacrificial layer
20: ventilation layer
30: Interface layer
40: Adhesive layer
100: Pressure drop sheet
200: Battery cell stack
300: Venting hole
400: Upper plate
500: Lower housing One or more embodiments described above are directed to providing a system and method for verifying memory integrity capable of improving stability of software operation by individually performing not only integrity verification for all data stored in a flash memory area, but also integrity verification for preset important data groups.

The secure memory module 100, the secure memory unit 100, the integrity verifier 200, the integrity verification unit 200, the verification processor 300, the verification processing unit 300, the entire integrity verifier 210, the entire integrity verification unit 210, the group integrity verifier 220, the group integrity verification unit 220, and the other computing apparatuses, the electronic devices, the processors, the memories, and other components described herein with respect to FIGS. 1-4 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD–ROMs, CD–Rs, CD+Rs, CD–RWs, CD+RWs, DVD–ROMs, DVD–Rs, DVD+Rs, DVD–RWs, DVD+RWs, DVD–RAMs, BD–ROMs, BD–Rs, BD–R LTHs, BD–Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A system for verifying memory integrity, comprising:
   a memory configured to store two or more key values for generating a message authentication code (MAC) value; and
   one or more processors, the one or more processors configured to:
   generate a MAC value through two or more pre-stored MAC processes using a data table based on an analysis of data stored in a corresponding memory area and any one key value selected from the memory according to a criterion and to compare the generated MAC value and a stored MAC value that is matched with a corresponding key value, and
   determine that data manipulation has occurred, in response to the generated MAC value and the stored MAC value not matching using a result of the comparison, and to perform a preset operation.

2. The system of claim 1, wherein the one or more processors are further configured to:

use a result of the analysis of the data stored in the data table to generate MAC values for all data through any one of the pre-stored MAC processes using the all data and preset key values for the all data and to compare the generated MAC values and the stored MAC value that is matched with the corresponding key value.

3. The system of claim 2, wherein the one or more processors are further configured:
use the analysis result of the data stored in the data table to generate a MAC value for a corresponding main data group through another pre-stored MAC process using a preset key value for each of at least one predefined main data group, and to compare the generated MAC value and the stored MAC value that is matched with the corresponding key value.

4. The system of claim 3, wherein the one or more processors are further configured to compare generated MAC values and stored MAC values for sequentially defined main data groups using the analysis result of the data stored in the data table.

5. The system of claim 3, wherein the one or more processors are further configured to determine that data manipulation has occurred for all corresponding data or main data group, in response to the generated MAC value and the stored MAC value not matching, and to generate a manipulation occurrence alarm signal, and to replace and store the all corresponding data or the main data group with a pre-stored default value.

6. The system of claim 1, wherein the one or more processors are further configured to use the analysis result of the data stored in the data table in advance to generate and store MAC values for all data through one of the pre-stored MAC processes using any one of preset key values.

7. The system of claim 1, wherein the one or more processors are further configured to use the analysis result of the data stored in the data table in advance to generate and to store the MAC value for the corresponding main data group through another pre-stored MAC process using any one of preset key values for each group for at least one predefined main data group among all the data.

8. The system of claim 7, wherein the one or more processors are further configured to use the analysis result of data stored in the data table in advance to generate and to store MAC values for all main data groups sequentially defined.

9. The system of claim 1, wherein the one or more processors are further configured to:
apply a first MAC process using a first key value to generate a first MAC value for all data stored in the memory area;
apply a second, different MAC process using one or more second key values to independently generate MAC values for each of a plurality of predefined main data groups; and
upon detecting a mismatch between the generated first MAC value and a stored first MAC value, determine whether data manipulation has occurred in individual main data groups by comparing the group-specific MAC values to corresponding stored values, and selectively replace only the main data groups for which mismatches are detected with corresponding default values.

10. A processor-implemented method for verifying memory integrity using an arithmetic processor, the method comprising:
generating a message authentication code (MAC) value using two or more pre-stored MAC processes by reading, by an integrity verifier, a data table based on an analysis of data stored in a corresponding memory area and using any one key value selected according to a criterion from among two or more key values to generate a MAC value stored in a secure memory module;
comparing, by the integrity verifier, the generated MAC value and a stored MAC value that is matched with a corresponding key value; and
determining that data manipulation has occurred, in response to the generated MAC value and the stored MAC value not matching based on a result of the comparison; and performing a preset operation according to a result of the determination.

11. The method of claim 10, wherein the generating of the MAC value comprises reading the data table and using MAC values for all data and preset key values for the all data to generate the MAC values for the all data using any one of the pre-stored MAC processes.

12. The method of claim 11, wherein the generating of the MAC value further comprises a group MAC generation step of reading the data table and using another pre-stored MAC process using preset key values for each of at least one predefined main data group among the all data to generate MAC values for each main data group using another pre-stored MAC process.

13. The method of claim 12, wherein the group MAC generation step is repeatedly performed to generate MAC values for predefined main data groups.

14. The method of claim 12, further comprising:
prior to the comparing, reading, by the integrity verifier, the data table based on an analysis of the data stored in the corresponding memory area and using key values for all the data among two or more key values for generating the MAC value stored in the secure memory module to generate and store the MAC values for the all data using any one of the pre-stored MAC processes.

15. The method of claim 14, further comprising:
prior to the comparing, a group MAC storage step of reading, by the integrity verifier, the data table and using key values for each of the predefined main data groups among two or more key values for generating the MAC value stored in the secure memory module to generate and store MAC values for each main data group using other pre-stored MAC processes.

16. The method of claim 15, wherein the group MAC storage step is repeatedly performed to generate and store the MAC values for the predefined main data groups.

17. The method of claim 15, wherein the comparing comprises reading the MAC value generated in the group MAC generation step and the MAC value stored in the group MAC storage step for the comparison.

18. The method of claim 15, wherein the comparing comprises a group data verification step of reading the MAC values generated for each main data group in the group MAC generation step and the MAC values for the each main data group stored in the group MAC storage step for the comparison of the each main data group.

19. The method of claim 18, wherein the group data verification step is repeatedly performed to for the comparison of the entire main data group.

20. The method of claim 10, wherein, the determining that the data manipulation has occurred comprises generating a manipulation occurrence alarm signal of the corresponding data, and the corresponding data is replaced with a pre-stored default value and stored, in response to determining that the data manipulation has occurred.

* * * * *